United States Patent [19]

Howell et al.

[11] Patent Number: 4,921,916

[45] Date of Patent: May 1, 1990

[54] FLAME-RETARDANT FILLERS IN SILANE-GRAFTED ETHYLENE POLYMER PROCESS

[75] Inventors: Barry G. Howell, High Wycombe; Diane E. M. Ness, London; Ronald A. Harvey, Leatherhead, all of England

[73] Assignee: BICC plc, London, England

[21] Appl. No.: 222,400

[22] Filed: Jul. 19, 1988

Related U.S. Application Data

[63] Continuation of Ser. No. 901,534, filed as PCT GB86/04594 on Feb. 5, 1986, published as WO86/04594 on Aug. 14, 1986, abandoned.

[30] Foreign Application Priority Data

Feb. 5, 1985 [GB] United Kingdom ............... 8502928

[51] Int. Cl.$^5$ .......................... C08K 3/22; C08K 3/30
[52] U.S. Cl. ................................ 525/423; 524/436; 524/437; 524/535
[58] Field of Search ............... 524/423, 436, 437, 535

[56] References Cited

U.S. PATENT DOCUMENTS

| 4,058,583 | 11/1977 | Glander et al. | 522/109 |
|---|---|---|---|
| 4,322,575 | 3/1982 | Skipper | 524/437 |
| 4,351,790 | 9/1982 | Hochstrasser et al. | 525/288 |
| 4,598,116 | 7/1986 | Keough et al. | 524/398 |

FOREIGN PATENT DOCUMENTS

| 58-118828 | 7/1983 | Japan . |
| 59-64653 | 4/1984 | Japan . |
| 59-217750 | 12/1984 | Japan . |
| 1286460 | 8/1972 | United Kingdom . |
| 1514081 | 6/1978 | United Kingdom . |
| 1526398 | 9/1978 | United Kingdom . |
| 1603300 | 11/1981 | United Kingdom . |

OTHER PUBLICATIONS

Delivery Programme for the Thermoplastics Industry, Akzo Chemie, "Polymerization Initiators", A1.0.1.4/0983.
Joseph A. Sneller, Modern Plastics International, Dec. 1984, pp. 38–40.
Trade Publication of Akzo Chemie, Noury Initiators, Delivery Programme for the Thermoplastics Industry, D, 1, 01, 4/0983.
Chemical Abstracts 99, No. 26, Dec. 26, 1983, p. 48, No. 213576y.
Chemical Abstracts 101, No. 16, Oct. 15, 1984, p. 51, No. 131816x.
Chemical Abstracts 102, No. 16, Apr. 22, 1985, p. 36, No. 132968f.

*Primary Examiner*—John C. Bleutge
*Assistant Examiner*—Robert E. L. Sellers, II
*Attorney, Agent, or Firm*—Oliff & Berridge

[57] ABSTRACT

A flame-retardant cross-linkable polymer composition for extrusion which is capable of producing non-porous products comprises: at least one flame-retardant filler of the class that evolve substantial amounts of bound water on heating at temperatures above a value $T_d$ that lies in the range 120°–250° C.; a compatible ethylene copolymer base in which the filler is dispersed; a hydrolysable unsaturated silane; and a free-radical grafting initiator having a half-life of less than 10 minutes at a temperature 25° C. below $T_d$.

7 Claims, No Drawings

FLAME-RETARDANT FILLERS IN SILANE-GRAFTED ETHYLENE POLYMER PROCESS

This is a Continuation of application Ser. No. 06/901,534 filed as PCT GB86/04594 on Feb. 5, 1986, published as WO86/04594 on Aug. 14, 1986, now abandoned.

This invention relates to polymer compositions based on ethylene polymers that can be crosslinked after extrusion and has important applications in compositions for use as the dielectric (insulation) and/or sheath (jacket) of electric cables.

Crosslinking of the polymeric parts of wires and cables is desirable, and sometimes essential, to impart good mechanical toughness and resistance to solvents and thermal deformation. Radiation crosslinking necessitates the installation of plant at very high capital cost, and also gives problems in obtaining a uniform dose (and therefore crosslink density) over the cross-section of the cable. Conventional chemical crosslinking with peroxides and/or sulphur requires pressurised curing chambers at high temperatures. The high temperatures required for cure severely limit line speeds, and have high energy costs plus high scrap rates at start-up due to inability to observe the product until it has emerged from the long curing chamber.

There has therefore been considerable interest in the past decade and a half in a low capital cost chemical crosslinking technique that does not require a pressurised and heated chamber and hence enables the extrusion quality to be observed as easily and quickly as that of a thermoplastic product; it is based on a two-step chemical reaction in which a hydrolysable unsaturated silane is first grafted to a base polymer (usually a homopolymer or copolymer of ethylene) and subsequently crosslinking is brought about by catalysed condensation reaction between pairs of silane groups. This 'Sioplas' process was first introduced by Dow Corning Limited (formerly Midland Silicones Limited) as a 2-stage process using separate machines for the grafting and extrusion steps (U.K. Patent No. 1286460) but was subsequently improved by the applicants in conjunction with Etabs. Maillefer S A (U.K. Patent No. 1526398) to operate a single-stage process with grafting in the extruder. This one-stage process has been used on a significant scale, but its application has been restricted, hitherto, by the inability of experts in the art to provide halogen-free compositions crosslinkable by this process having commercially acceptable flame retardant characteristics.

Experiments with alumina trihydrate, or other flame-retardant fillers that evolve water on heating, in conventional compositions for one-stage Sioplas crosslinking based on ethylene polymers (copolymers with ethyl acetate, ethyl acrylate, propylene etc. and some homopolymers) have failed, partially through unacceptable premature crosslinking (as might have been expected because of the risk of the filler evolving water at grafting temperature) and partially through the production of a porous product that was wholly unacceptable for electrical applications; and experts have drawn the conclusion that water-evolving fillers are incompatible with one-stage Sioplas chemistry (see, for example, Modern Plastics International, December 1984 pp 38–40).

We have now discovered that this conclusion of the prior art is unjustified and that satisfactory results can be obtained simply by making an unconventional choice of initiator for the crosslinking reaction.

In accordance with the invention, a crosslinkable polymer composition for extrusion comprises:

at least one flame-retardant filler of the class that evolve substantial amounts of bound water on heating at temperatures above a value $T_d$ which value lies in the range 120°–250° C.;

a compatible ethylene polymer base in which the filler is dispersed;

a hydrolysable unsaturated silane;

and a free-radical grafting initiator having a half-life of less than 10 minutes at a temperature 25° C. below $T_d$ as determined by Differential Thermal Analysis using chlorobenzene as solvent; see for instance "Noury Initiators", Delivery Programme of the Thermoplastics Industry, a current publication of Akzo Chemie U.K. Limited.

A silanol condensation catalyst will also be required to obtain crosslinking in an acceptably short time.

It will be immediately obvious to the skilled reader that the composition specified must be formed by mixing the ingredients together under such conditions that no chemical reaction occurs between them, and in particular that mixing must take place at a temperature low enough to ensure that the initiator is not decomposed (or premature grafting would occur); and that, in the eventual use of the claimed composition which may follow immediately after mixing is complete, the mixture must be heated to a temperature at which the initiator is decomposed, but below (preferably at least 25° C. below) the $T_d$ of the filler to generate the free-radicals required to affect grafting and allow subsequent reactions to proceed in the usual way.

The most readily available fillers of the class defined are gypsum ($T_d = 128°$ C.), alumina trihydrate ($T_d = 170°$ C.), and magnesium hydroxide ($T_d = 250°$ C.) Gypsum is not recommended as there are practical difficulties with most polymers if $T_d$ is below 150° C., and magnesium hydroxide is much preferred as its higher $T_d$ value not only gives a much wider choice of initiators but also allows a higher extrusion rate because of the higher permissible processing temperature. Fillers coated to enhance compatibility with the polymer are preferred, suitable coating materials including oleates and other fatty acid soaps, silanes, titanates, siloxanes, and carboxylated butadiene polymers (for example those described in British Patent No. 1603300) and other low-molecular weight polymers and oligomers containing carboxyl groups. Particularly suitable magnesium hydroxide fillers are commercially available from Kyowa Chemical Industry Company Limited (Japan) under the trade mark 'Kisuma'. If more than one water-evolving filler is present, the relevant $T_d$ will, of course, be the lower or lowest.

The polymer may be any of the well-known types that is capable of accepting the quantity of filler needed to meet flame retardance requirements without unacceptable loss of physical and/or electrical properties; ethylene-vinyl acetate copolymers (EVA) (containing from about 5 to about 70 mole % of vinyl acetate) are most preferred, but ethylene/ethyl acrylate, ethylene/methyl acrylate, ethylene butyl acrylate and rubbery and non-rubbery ethylene/propylene copolymers (and terpolymers) are also suitable), as are some ethylene homopolymers, such as the one of low molecular weight sold by Union Carbide Group, under the Trade Mark UCAR as UCAR FLX, and butyl grafted polyethylenes such as that sold by ASEA Kabel AB under the designation ET Polymer. Mixtures of polymers can be used.

Filler to polymer ratios will depend upon the balance of flame retardance to physical and electrical properties required, usually in the range from 3:1 to 1:2 by weight (subject to limits of compatibility).

The most usual silane is vinyl trimethoxy silane (VTMOS), but any of the silanes used in conventional Sioplas processes can be used. A list is included in the specification of U.K. Patent No. 1286460. Amounts required to achieve a substantial or desired degree of crosslinking are broadly as for the conventional process, based upon the active polymer content of the mixture.

The grafting initiator will normally be peroxide, examples of suitable commercially available peroxides being as follows:

(a) for gypsum, alumina trihydrate and magnesium hydroxide
  Tertiary butyl per pivalate
  Tertiary amyl per pivalate
  Di(3,5,5 trimethyl hexanoyl) peroxide
  Bis (2 methyl benzoyl) peroxide
  Di normal octanoyl peroxide
  Di-decanoyl peroxide
  Dilauroyl peroxide (b) for both alumina trihydrate and magnesium hydroxide (but not for gypsum):
  Tertiary butyl per 2-ethyl hexanoate (TBPEH).
  Tertiary butyl per isobutyrate
  Tertiary butyl peroxy diethyl acetae
  Dibenzoyl peroxide
  1,1 Di-tertiary butyl peroxy-3,3,5-trimethyl cyclohexane
  Tertiary butyl hydroxy 3,5,5, trimethyl hexanoate
  Tertiary butyl peroxy isopropyl carbonate
  Tertiary butyl peracetate
  Tertiary butyl perbenzoate
  1,1 Bis (tertiary butyl peroxy) cyclohexane
  2,2 Bis (tertiary butyl peroxy) butane.
  Normal butyl 4,4 bis (tertiary butyl peroxy) valerate and (c) for magnesium hydroxide (but not for alumina trihydrate or gypsum):
  Dicumyl peroxide
  2,5-Dimethyl 2,5-di (tertiary butylperoxy) hexane
  1,4-Di (tertiary butylperoxy iso propyl) benzene
  Tertiary butyl cumyl peroxide
  Di-tertiary butyl peroxide Quantities of grafting initiator required to achieve a substantial or desired degree of crosslinking can be determined by trial in the usual way.

Dibutyl tin dilaurate (DBTDL) (at a level of the order of 0.01%) is the only silanol condensation catalyst in regular use for Sioplas crosslinking and is preferred; many alternatives are listed in the specification of U.K. Patent No. 1286460.

The compositions may also include conventional Sioplas-compatible antioxidants and other stabilisers, processing aids, lubricants, pigments and usually minor amounts of other fillers such as magnesium carbonate, calcium carbonate, double carbonates of magnesium and calcium (such as dolomite), antimony trioxide, antimony pentoxide and zinc borate.

Preferably the polymer and filler are pre-blended and dried prior to the addition of the other ingredients.

In the following examples, all parts are by weight unless otherwise indicated.

EXAMPLE 1

49.7 Parts of the ethylene-vinyl acetate copolymer (28 weight % vinyl acetate) sold under the trademark Evatane and the grade designation 28-05 was melted and homogenised on a two roll mill at 80°-90° C. and blended on the mill with 49.8 parts of the magnesium hydroxide filler sold under the trademark Kisuma and the grade designation 5B (believed to be oleate coated and of the kind described and claimed in U.K. Patent No. 1514081) and 0.5 parts of the antioxidant sold under the trademark Flectol as Flectol pastilles.

The blend was dried for at least 16 hours at 55° C. using a dehumidified hot air dryer (sold under the designation Drymaster). To this dried base mix were added 0.9 parts VTMOS, 0.45 parts TBPEH and 0.01 parts DBTDL and the mixture was extruded in a 38 mm 20D laboratory extruder with a screw of nominal compression ratio 2:1 operating at a uniform temperature of 130° C. to give an insulating covering free of porosity with a radial thickness of 0.75 mm on a round copper wire 1.2 mm in diameter at a line speed of 1.8 m/min. Curing was in water at 70° C. for 24 hours.

The insulation had a tensile strength of 12.7 MPa, elongation at break of 172% and in a hot set test at 2 bar and 200° C. showed an elongation of 15% and a set of $-5\%$. Its volume resistivity (at 75° C. and 600 V d.c.) was higher than $10^{10}$ $\Omega$m after 30 weeks immersion in water at that temperature. (Two samples were tested; one had unchanged volume resistivity after 62 weeks; the other had fallen to $8 \times 10^8$ $\Omega$m).

EXAMPLE 2

Substantially the same procedure was followed as in Example 1 but using:

(a) as the base mix 37 parts of Evatane 28-05, 5 parts of another EVA sold by Allied Chemical Company under the designation AC400A (to improve extrusion characteristics) and 57.5 parts of Kisuma 5A (similar to Kisuma 5B but believed to be stearate coated) and 0.5 parts of Flectol pastilles; and (b) as curative system 0.65 parts VTMOS, 0.25 parts TBPEH, and 0.01 parts DBTDL.

The line speed in this case was 2.6 mm/min.

The insulation had a tensile strength of 11.9 MPa, elongation at break of 145% and in the hot set test showed an elongation of about 40% and sets of $-2.5$ and 0 on two samples. Its volume resistivity after 37 weeks under the same conditions as in Example 1 was better than $10^{10}$ $\Omega$m.

EXAMPLE 3

Substantially the same procedure was followed as in Example 1 but using as the base mix 40.5 parts Evatane 28-05, 5 parts of AC400A and 54 parts of the hydrated alumina sold under the trademark Hydral and the grade number 710. The line speed was 2 m/min.

The insulation had a tensile strength of 14.2 MPa, elongation at break of 199% and in the hot set test showed an elongation of about 20% and a set of $-3\%$. Its volume resistivity (at 75° C. and 600 V d.c.) was higher than $5 \times 10^8$ $\Omega$m after 45 weeks immersion in water at that temperature.

EXAMPLES 4-37

The procedure of example 3 was followed with a variety of base mixes (all including approximately 0.5 parts Flectol pastilles, not listed in the tables) with the results indicated below. (Line speed and radial thickness varied somewhat). Ingredients used in these examples and not previously referred to are as follows:

Fillers:
- Marinco H: Uncoated magnesium hydroxide from Merck & Co. Inc. USA.
- Kisuma 5E: Anther coated magnesium hydroxides from Kyowa Chemical Industry Co. Ltd. Japan.
- DC: Magnesium hydroxide, received uncoated from Morton Thiokol Inc. U.S.A. and coated with 1.6% Y9774.
- Lycal 96HSE and DPM/PH10/200: Uncoated magnesium hydroxides respectively from Steetley Magnesia Division U.K. and Pennine Darlington Magnesia Limited, U.K.
- Ultracarb U5: A mixed filler of magnesium hydroxy carbonate and calcium magnesium carbonate from Microfine Minerals Limited, U.K.
- Ultracarb M5: a version of Ultracarb U5 with a polymeric coating (The $T_d$'s of Ultracarb fillers have not yet been accuraturely measured)

Ethylene polymers:
- DPDM 6182 Ethylene/ethyl acrylate copolymer from BP Chemicals Limited, U.K.
- DEFD1225 A polyethylene of very low density from Union Carbide Corp., U.S.A.

Other ingredients:
- AC6A: Polyethylene, from Allied Chemicals, U.S.A.
- Omya EXH1: Calcium carbonate from Croxton and Garry Limited, U.K.
- A174: Gamma methacryloxypropyl trimethoxy silane from Union Carbide Corporation, U.S.A.
- DC1107: Methyl hydrogen polysiloxane from Dow Corning Limited, U.K.
- Y9774: A proprietary silane from Union Carbide Group, U.S.A.
- Surlyn 9450: An ionomeric polymer from Du Pont, U.S.A.

In the case of precoated fillers, the quantity shown in the tables includes the weight of the coating, the percentage of which, relative to the total weight of that coated filler, is given immediately below.

All compositions of the Examples showed low values in the hot set test, indicative of a sufficient degree of crosslinking for typical wire and cable applications and all, except only Example 20, passed the Horizontal Specimen Flame Test defined in paragraph 102 of UL 62 Standard for Flexible Cord and Fixture Wire. The compositions of Examples 2 and 25 also passed the IEC 332 Part 1 vertical burning test, which is a very stringent test for the small wire size of these samples.

All the Examples except Examples 7-12 and Example 37 met the electrical property requirements required of conventional PVC-based materials by the applicable British Standard (BS 6746: 1984).

TABLE 1

| Example | 4 | 5 | 6 | 7 |
|---|---|---|---|---|
| Base Composition |  |  |  |  |
| Fillers |  |  |  |  |
| Kisuma 5B | 55 | 55 |  |  |
| Kisuma 5E |  |  | 49.5 |  |
| Marinco H |  |  |  | 49.8 |
| Lycal 96 HSE |  |  |  |  |
| Coating A174 (%) |  |  |  |  |
| Coating Other (%) |  |  |  |  |
| Hydral 710 |  |  |  |  |
| Copolymer |  |  |  |  |
| Evatane 28-05 | 44.5 | 39.5 | 50 | 49.7 |
| Evatane 18-02 |  |  |  |  |
| Nordel 2722 |  |  |  |  |
| DPDM 6182 |  |  |  |  |
| Additives |  |  |  |  |
| AC 400A |  | 5.0 |  |  |
| AC6A |  |  |  |  |
| Surlyn 9450 |  |  |  |  |
| Tensile Strength MPa | 13.1 | 11.5 | 15.6 | 13.6 |
| Elongation % | 121 | 142 | 152 | 189 |
| Hot-Set Extension % | 15 | 15–20 | 20 | 25–30 |
| Set % | −3 to 0 | −3 to 0 | −3 to 0 | 0 |
| Remarks | B | C | C |  |

TABLE 2

| Example | 8 | 9 | 10 | 11 |
|---|---|---|---|---|
| Base Composition: |  |  |  |  |
| Fillers |  |  |  |  |
| Kisuma 5B |  |  |  |  |
| Kisuma 5E |  |  |  |  |
| Marinco H |  |  |  |  |
| Lycal 96 HSE | 50 | 50 | 50 | 50 |
| Coating A174 (%) |  |  |  |  |
| Coating Other (%) |  |  |  |  |
| Hydral 710 |  |  |  |  |
| Copolymer |  |  |  |  |
| Evatane 28-05 | 43.5 | 45.5 | 49.5 |  |
| Evatane 18-02 |  |  |  | 49.5 |
| Nordel 2722 |  |  |  |  |
| DPDM 6182 |  |  |  |  |
| Additives |  |  |  |  |
| AC400A | 6.0 |  |  |  |
| AC6A |  | 4.0 |  |  |
| Surlyn 9450 |  |  |  |  |
| Tensile Strength MPa | 11.3 | 12.2 | 13.9 | 12.9 |
| Elongation % | 100 | 96 | 94 | 114 |
| Hot Set-Extension % | 20–35 | 15–20 | 10–15 | 10–20 |
| Set % | −3 | 0 | −3 to 0 | −2.5 |
| Remarks |  |  |  |  |

TABLE 3

| Example | 12 | 13 | 14 | 15 |
|---|---|---|---|---|
| Base Composition: |  |  |  |  |
| Fillers |  |  |  |  |
| Kisuma 5B |  |  |  |  |
| Kisuma 5E |  |  |  |  |
| Marinco H |  |  |  |  |
| Lycal 96 HSE | 50 | 51 | 51.5 | 52 |
| Coating A174 (%) |  | (2) | (3) | (4) |
| Coating Other (%) |  |  |  |  |
| Hydral 710 |  |  |  |  |
| Copolymer |  |  |  |  |
| Evatane 28-05 | 37.1 | 48.5 | 48.0 | 47.5 |
| Evatane 18-02 |  |  |  |  |
| Nordel 2722 |  |  |  |  |
| DPDM 6182 |  |  |  |  |
| Additives |  |  |  |  |
| AC400A |  |  |  |  |
| AC6A |  |  |  |  |
| Surlyn 9450 | 12.4 |  |  |  |
| Tensile Strength MPa | 10.5 | 13.9 | 14.0 | 13.2 |
| Elongation % | 116 | 148 | 150 | 144 |
| Hot Set-Extension % | 25–30 | 15–20 | 15 | 20 |
| Set % | 7.5 | −2½ to 0 | −5 | 0 |
| Remarks |  |  |  |  |

TABLE 4

| Example | 16 | 17 | 18 | 19 |
|---|---|---|---|---|
| Base Composition: |  |  |  |  |
| Fillers |  |  |  |  |
| Kisuma 5B |  |  |  |  |
| Kisuma 5E |  |  |  |  |

TABLE 4-continued

| Example | 16 | 17 | 18 | 19 |
|---|---|---|---|---|
| Marinco H | | | | |
| Lycal 96 HSE | 52.5 | 53.5 | 50.2 | 40.8 |
| Coating A174 (%) | (5) | (7) | (2) | (2) |
| Coating Other (%) | | | | |
| Hydral 710 | | | | |
| Copolymer | | | | |
| Evatane 28-05 | 47.0 | 46.0 | | 58.6 |
| Evatane 18-02 | | | | |
| Nordel 2722 | | | 49.3 | |
| DPDM 6182 | | | | |
| Additives | | | | |
| AC400A | | | | |
| AC6A | | | | |
| Surlyn 9450 | | | | |
| Tensile Strength MPa | 13.6 | 12.8 | 5.7 | 11.4 |
| Elongation % | 144 | 117 | 100 | 125 |
| Hot Set-Extension % | 10-15 | 15 | 35 | 20-25 |
| Set % | −2.5 | 0 | −3 | −3 to 0 |
| Remarks | | | D | |

TABLE 5

| Example | 20 | 21 | 22 | 23 |
|---|---|---|---|---|
| Base Composition: | | | | |
| Fillers | | | | |
| Kisuma 5B | | | | |
| Kisuma 5E | | | | |
| Marinco H | | | | |
| Lycal 96 HSE | 30.6 | 50.2 | 51.0 | 51.5 |
| Coating A174 (%) | (2) | (2) | | |
| Coating Other (%) | | | (2)F | (3)F |
| Hydral 710 | | | | |
| Copolymer | | | | |
| Evatane 28-05 | 68.7 | | 49.5 | 48.0 |
| Evatane 18-02 | | | | |
| Nordel 2722 | | | | |
| DPDM 6182 | | 49.3 | | |
| Additives | | | | |
| AC400A | | | | |
| AC6A | | | | |
| Surlyn 9450 | | | | |
| Tensile Strength MPa | 11.0 | 13.1 | 13.3 | 13.7 |
| Elongation % | 400 | 66 | 132 | 146 |
| Hot Set-Extension % | 85-95 | 30 | 10-15 | 10-15 |
| Set % | 5-10 | −7.5 to 10 | −2.5 to −5 | −2.5 to −5 |
| Remarks | E | | F | F |

TABLE 6

| Example | 24 | 25 | 26 | 27 |
|---|---|---|---|---|
| Base Composition: | | | | |
| Fillers | | | | |
| Kisuma 5B | | | | |
| Kisuma 5E | | | | |
| Marinco H | | | | |
| Lycal 96 HSE | 52 | 52.5 | 52.0 | 50.75 |
| Coating A174 (%) | | | | |
| Coating Other (%) | (4)F | (4)F | (4)H | (1.5)J |
| Hydral 710 | | | | |
| Copolymer | | | | |
| Evatane 28-05 | 47.5 | 47.0 | 47.5 | 48.75 |
| Evatane 18-02 | | | | |
| Nordel 2722 | | | | |
| DPDM 6182 | | | | |
| Additives | | | | |
| AC400A | | | | |
| AC6A | | | | |
| Surlyn 9450 | | | | |
| Tensile Strength MPa | 13.7 | 13.3 | 14.4 | 12.3 |
| Elongation % | 140 | 146 | 124 | 87 |
| Hot Set-Extension % | 15-20 | 15 | 15 | 15-20 |
| Set % | −2.5 to −5 | −2.5 to −5 | −2.5 to −5 | −5 to 0 |

TABLE 6-continued

| Example | 24 | 25 | 26 | 27 |
|---|---|---|---|---|
| Remarks | F | F,G | H | J |

TABLE 7

| Example | 28 | 29 | 30 | 31 |
|---|---|---|---|---|
| Base Composition: | | | | |
| Fillers | | | | |
| Kisuma 5B | | | | 57.5 |
| Kisuma 5E | | | | |
| Marinco H | | | | |
| Lycal 96 HSE | | 30.0 | 20.0 | |
| Coating A174 (%) | | (2) | (2) | |
| Coating Other (%) | | | | |
| Hydral 710 | 54.0 | 25.0 | 40.0 | |
| Polymer | | | | |
| Evatane 28-05 | 40.5 | 39.5 | 34.5 | 32.8 |
| Evatane 18-02 | | | | |
| Nordel 2722 | | | | |
| DPDM 6182 | | | | |
| DEFD 1225 | | | | 4.2 |
| Additives | | | | |
| AC400A | 5.0 | 5.0 | 5.0 | 5.0 |
| AC6A | | | | |
| Surlyn 9450 | | | | |
| Tensile Strength MPa | 13.3 | 11.7 | 12.3 | 10.4 |
| Elongation % | 196 | 119 | 442 | 173 |
| Hot Set-Extension % | 25-30 | 10 | 65-70 | 65 |
| Set % | −3 | 0 | −5 | −2.5 |
| Remarks | | | | K |

TABLE 8

| Example | 32 | 33 | 34 |
|---|---|---|---|
| Base Composition: | | | |
| Fillers | | | |
| Kisuma 5B | | 28.3 | 28.2 |
| DC | 54.4 | | |
| Ultracarb M5 | | 28.3 | 28.2 |
| Polymer | | | |
| Evatane 28-05 | 40.1 | 37.9 | 38.1 |
| DEFD 1225 | | | |
| Additives | | | |
| AC400A | 5.0 | 5.0 | 5.0 |
| Tensile Strength MPa | 8.2 | 9.4 | 10.4 |
| Elongation % | 386 | 224 | 193 |
| Hot Set-Extension % | 25-30 | 30 | 10-15 |
| Set % | 0 | −2.5 | −2.5/7.5 |
| Remarks | K | K | K |

TABLE 9

| Example | 35 | 36 | 37 |
|---|---|---|---|
| Base Composition: | | | |
| Fillers | | | |
| Kisuma 5B | 57.5 | | |
| DC | | | |
| PDM/PH10/200 | | | 53.8 |
| Ultracarb M5 | | 56 | |
| Polymer | | | |
| Evatane 28-05 | 32.0 | 38.5 | 40.7 |
| DEFD 1225 | 10 | | |
| Additives | | | |
| AC400A | | 5.0 | 5.0 |
| Tensile Strength MPa | 13.9 | 7.8 | 7.2 |
| Elongation % | 67 | 231 | 140 |
| Hot Set-Extension % | 30 | 60 | 50-55 |
| Set % | −10/−12.5 | 2.5 | 2.5 |
| Remarks | K | K | K |

We claim:

1. A process for making a halogen-free fire-retardant crosslinked extruded product comprising first forming a halogen-free composition whose essential ingredients are:
- at least one filler;
- a compatible ethylene polymer base in which the filler is dispersed;
- a hydrolysable unsaturated silane;
- a free-radical grafting initiator;
- and a silanol condensation catalyst; said filler being a flame-retardant filler of the class that evolve substantial amounts of bound water on heating at temperatures above a value $T_d$ which value lies in the range 120°–250° C.; the ratio of filler to polymer being in the range of 3:1 to 1:2 by weight; and said initiator having a half-life of less than 10 minutes at a temperature 25° C. below the $T_d$ of said filler as determined by Differential Thermal Analysis using chlorobenzene as a solvent;
- second, and only after said ingredients have been mixed together, raising the temperature to a grafting temperature below said $T_d$ but at which said initiator decomposes to generate free-radicals that effect grafting of said silanes to said polymer;
- third extruding the mixture containing the grafted polymer from an extrusion die to form a shaped product;
- and fourth exposing said shaped product to water until it is crosslinked by hydrolytic condensation reactions of the grafted silane.

2. A process a claimed in claim 1 in which said grafting temperature is at least 25° C. below said $T_d$ value.

3. A process as claimed in claim 1 characterized by the use in combination of magnesium hydroxide as said flame-retardant filler and tertiary butyl per 2-ethyl hexanoate as said initiator.

4. A process as claimed in claim 1 characterized by the use in combination of a filler selected from the group consisting of gypsum, alumina trihydrate and magnesium hydroxide and a grafting initiator selected from the group consisting of
- Tertiary butyl per pivalate
- Tertiary amyl per pivalate
- Di (3,5,5 trimethyl hexanoyl) peroxide
- Bis (2 methyl benzoyl) peroxide
- Di normal octanoyl peroxide
- Di-decanoyl peroxide and
- Dilauroyl peroxide.

5. A process as claimed in claim 1 characterized by the use in combination of a filler selected from the group consisting of alumina trihydrate and magnesium hydroxide and a grafting initiator selected from the group consisting of
- Tertiary butyl per 2-ethyl hexanoate (TBPEH)
- Tertiary butyl per isobutyrate
- Tertiary butyl peroxy diethyl acetate
- Dibenzoyl peroxide
- 1,1 Di-tertiary butyl peroxy-3,3,5-trimethyl cyclohexane
- Tertiary butyl peroxide 3,5,5 trimethyl hexanoate
- Tertiary butyl peroxy isopropyl carbonate
- Tertiary butyl peracetate
- Tertiary butyl perbenzoate
- 1,1 Bis (tertiary butyl peroxy) cyclohexane
- Normal butyl 4,4 bis (tertiary butyl peroxy) valerate and
- 2,2 Bis (tertiary butyl peroxy) butane.

6. A process as claimed in claim 1 characterized by the use in combination of magnesium hydroxide as said filler and a grafting initiator selected from the group consisting of
- Dicumyl peroxide
- 2,5-Dimethyl 2,5-di (tertiay butylperoxy) hexane
- 1,4-Di (tertiary butylperoxy iso propyl) benzene
- Tertiary butyl cumyl peroxide and
- Di-tertiary butyl peroxide.

7. A halogen-free, fire retardant crosslinked extruded product comprising a flame-retardant filler of the class that evolve substantial amounts of bound water on heating at temperatures above a value $T_d$ which value lies in the range 120°–250° C., said filler being dispersed in a compatible ethylene polymer base and the ratio of said filler to said polymer being in the range from 3:1 to 1:2 by weight; said polymer being crosslinked by silane-condensation crosslinks, said product being made by first forming a composition comprising said filler, said polymer base, a hydrolysable unsaturated silane, a free-radical initiator having a half-life of less than 10 minutes at a temperature 25° C. below the $T_d$ of said filler as determined by Differential Thermal Analysis using chlorobenzene as solvent, and a silanol condensation catalyst;
- second, and only after said ingredients have been mixed together, raising the temperature to a grafting temperature below said $T_d$ but at which said initiator decomposes to generate free-radicals that effect grafting of said silane to said polymer;
- third extruding the mixture containing the grafted polymer from an extrusion die to form a shaped product;
- and fourth exposing said shaped product to water until it is crosslinked by hydrolytic condensation reactions of the grafted silane.

* * * * *